United States Patent Office 3,806,522
Patented Apr. 23, 1974

3,806,522
PROCESS FOR THE PREPARATION OF 3-ACYL-OXY-3-(3'-LOWER CARBOALKOXY-4'-HYDROXY-1'-NAPHTHYL)NAPHTHALIDE
Michael H. Feingold, Pinehurst, Mass., assignor to Polaroid Corporation, Cambridge, Mass.
No Drawing. Filed Dec. 11, 1972, Ser. No. 314,095
Int. Cl. C07d 7/10
U.S. Cl. 260—343.2 R      6 Claims

ABSTRACT OF THE DISCLOSURE

This invention relates to the synthesis of 3-acyloxy-3-(3'-lower carboalkoxy-4'-hydroxy - 1' - naphthyl)naphthalides by the reaction of a 3-(3'-lower carboalkoxy-4'-oxo-1'-naphthylidene)naphthalide and an organic carboxylic acid.

BACKGROUND OF THE INVENTION

(1) Field of the invention

This invention relates to a method of preparing naphthalide indicator dyes, and in particular, it relates to the synthesis of certain 1-naphthol naphthalides useful as reagents in photography.

(2) Description of the prior art

Copending U.S. patent application Ser. No. 103,865 of Myron S. Simon filed Jan. 4, 1971 discloses and claims certain indicator dyes derived from 1-naphthols which find particular utility as optical filter agents in photographic processes for protecting an exposed photosensitive material from post-exposure fogging during development in the presence of incident light. Specifically, the 1-naphthol indicator dyes disclosed therein comprise 3,3-disubstituted phthalides and naphthalides wherein the 3,3-substituents are 4'-hydroxy-1'-naphthyl radicals at least one and preferably both of which possess a hydrogen-bonding group, such as, a carboxy, hydroxy, sulfonamido or sulfamoyl group substituted on a carbon atom adjacent to the 4'-hydroxy group. Among such dyes are phthalides and naphthalides wherein one or both of the 4'-hydroxy-1'-naphthyl radicals are substituted with a carboxy group in the 3'-position and which additionally may be substituted with an immobilizing group to render the dye substantially non-diffusible in a given photographic processing composition.

One method found particularly useful in preparing the latter naphthalide dyes forms the subject matter of copending U.S. patent application Ser. No. 314,097 of Yunn H. Chiang et al. filed concurrently herewith. In the method disclosed and claimed therein, a monoester of a 3-hydroxy-3-(3'-carboalkoxy-4' - hydroxy - 1'-naphthyl)-naphthalide is utilized as the intermediate for reaction with a 2-carboxy-1-naphthol. In a preferred embodiment, the method comprises reacting a 3-acetoxy-3-(3'-carboalkoxy-4'-hydroxy-1'-naphthyl-naphthalide and the selected naphthol in the presence of a catalytic amount of non-water producing base to form the corresponding 3-(3'-carboalkoxy - 4' - hydroxy-1'-naphthyl)-3-(3''-carboxy - 4'' - hydroxy - 1''-naphthyl)naphthalide dye precursor. The carboalkoxy group of the dye precursor is then converted to a carboxy group to yield the corresponding indicator dye product. In a particularly preferred embodiment, the 2-carboxy-1-naphthol reacted with the monoacetate intermediate contains an aliphatic substituent that may be used to adjust the mobility characteristics of the dye product in a particular medium.

The present invention is concerned with another method of preparing such dyes utilizing a different class of intermediates and with a method of preparing the intermediates and of preparing monoester derivatives thereof.

SUMMARY OF THE INVENTION

One object of the present invention is to provide a method of synthesizing 1-naphthol naphthalide indicator dyes.

Another object of this invention is to provide a method of synthesizing monoester intermediates useful in the preparation of these indicator dyes.

A further object of this invention is to provide a method of synthesizing dehydro intermediates useful in preparing both the monoester intermediates and the indicator dye products.

Other objects of this invention will in part be obvious and will in part appear hereinafter.

The invention accordingly comprises the processes involving the several steps and the relation and order of one or more of such steps with respect to each of the others, and the products and compositions possessing the features, properties and the relation of elements which are exemplified in the following detailed disclosure, and the scope of the application of which will be indicated in the claims.

According to the present invention, methods are provided for the synthesis of 1-naphthol naphthalide indicator dyes and for the synthesis of intermediates useful in the preparation of such dyes.

For a fuller understanding of the nature and objects of the invention, reference should be had to the following detailed description.

DESCRIPTION OF THE PREFERRED EMBODIMENTS

According to the present invention, it has been found that certain dehydro intermediates, namely, 3-(3'-lower carboalkoxy - 4' - oxo - 1' - naphthylidene)naphthalides may be synthesized from the corresponding 3-halo-3-(3'-lower carboalkoxy - 4' - hydroxy - 1'-naphthyl)naphthalides by treating the 3-halo naphthalide with an acid acceptor. Also, it has been found that the dehydro intermediates obtained may be reacted with an organic carboxylic acid to yield the corresponding 3-acyloxy-3-(3'-lower carboalkoxy - 4' - hydroxy - 1' - naphthyl)naphthalides useful in the method of aforementioned application Ser. No. 314,097 as the monoester intermediate for reaction with a 2-carboxy-1-naphthol to yield the naphthalide indicator dye precursor. Further, it has been discovered that the dehydro intermediates may be employed in a "one-pot" reaction with an organic acid and a 2-carboxy-1-naphthol to yield the naphthalide dye precursor directly thereby eliminating the step of synthesizing another intermediate, such as, the monoester for reaction with the selected naphthol.

These three reactions are illustrated in the following schemes designated A, B and C, respectively.

(A) 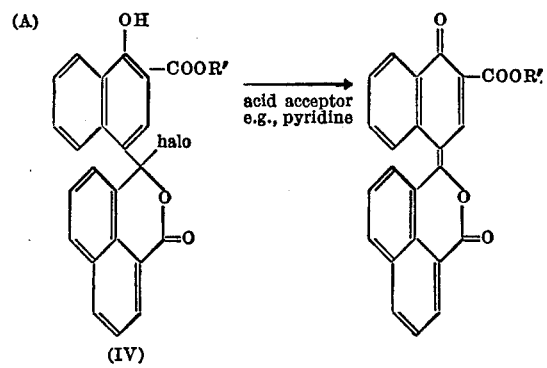

(IV)

(B) 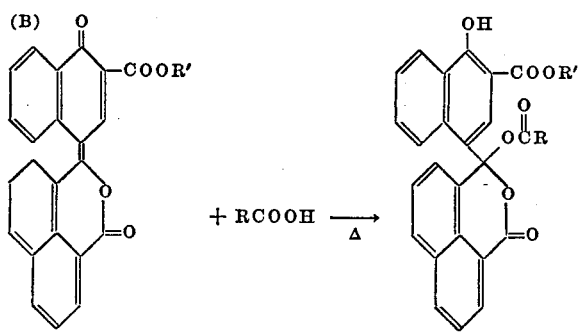

+ RCOOH →Δ

(C) 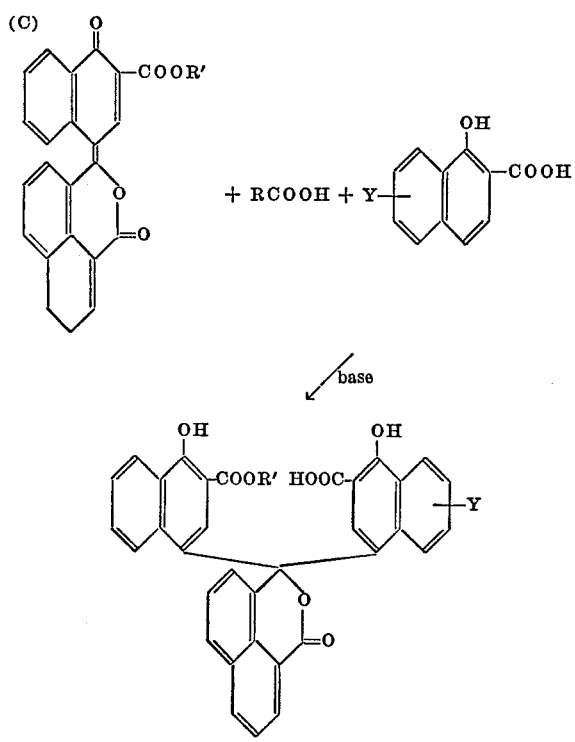

+ RCOOH + Y—

↙ base

The dehydro intermediates, i.e., the 3-(3'-lower carboalkoxy-4'-oxo-1'-naphthylidene)naphthalides that may be prepared according to the present invention may be represented by the formula:

(I) 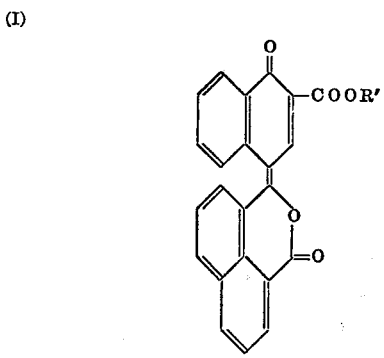

wherein R' is lower alkyl having 1 to 4 carbon atoms, such as, ethyl, propyl, isopropyl, n-butyl, t-butyl, and preferably methyl.

The monoester intermediates, i.e., the 3-acyloxy-3-(3'-lower carboalkoxy-4'-hydroxy-1' - naphthyl)naphthalides that may be prepared according to the present invention may be represented by the formula:

(II) 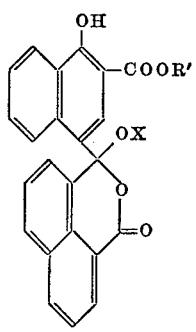

wherein —OX is an acyloxy radical derived from an organic di- or monocarboxylic acid, aromatic or aliphatic including branched or straight chain saturated or unsaturated aliphatic acids, e.g., an acyloxy radical,

wherein R is an alkyl group having 1 to 10 carbon atoms derived from a saturated aliphatic monocarboxylic acid, RCOOH, and R' is lower alkyl.

The carboxy-substituted 1-naphthol naphthalide dyes and dye precursors that may be produced according to the present invention may be represented by the formula:

(III) 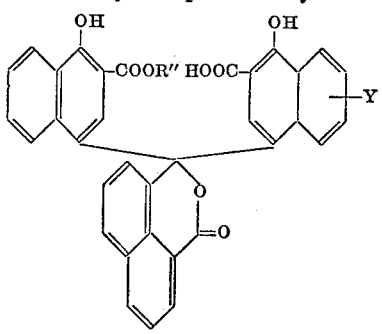

wherein Y is hydrogen or an aliphatic group usually containing up to about 20 carbon atoms and R'' is hydrogen or lower alkyl.

The aliphatic group, branched or straight chain, may be alkyl, such as methyl, ethyl, isopropyl, butyl, t-butyl, hexyl, dodecyl, octadecyl or eicosanyl; alkenyl, such as 3-butenyl, 2-methyl-1,3-butadienyl, 2-hexenyl and 9-octadecenyl; alkoxy, such as, ethoxy, butoxy, 1-ethoxy-2-(β-ethoxyethoxy), hexyloxy, dodecyloxy, and octadecyloxy; and alkoxyalkyl, such as, methoxyethyl, methoxyethoxyethyl, butoxydodecyl and ethoxyethoxyhexadecyl. Also, the aliphatic group may be substituted with a solubilizing group, i.e., the alkyl, alkenyl, alkoxy and alkoxyalkyl groups enumerated above may be substituted with a solubilizing group, e.g., —OH, —COOH and —SO₃H.

Specific examples of 1-naphthol indicator dyes that may be prepared according to the method of the present invention are as follows:

(1) 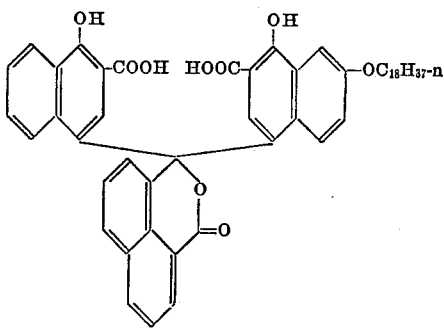

(2) 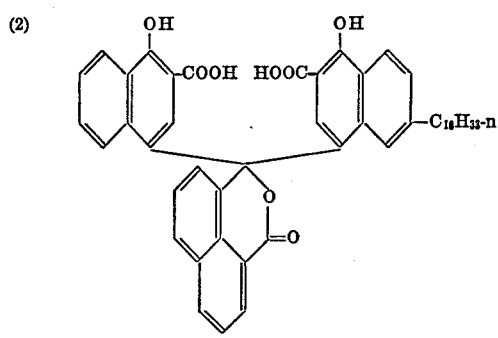
(3) 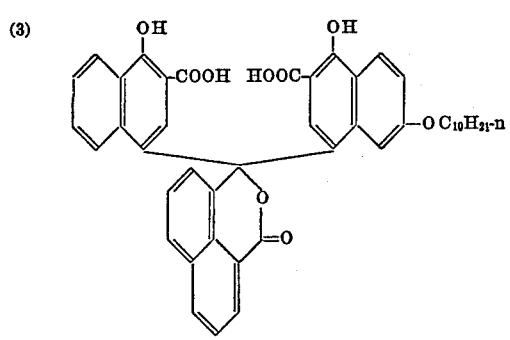
(4) 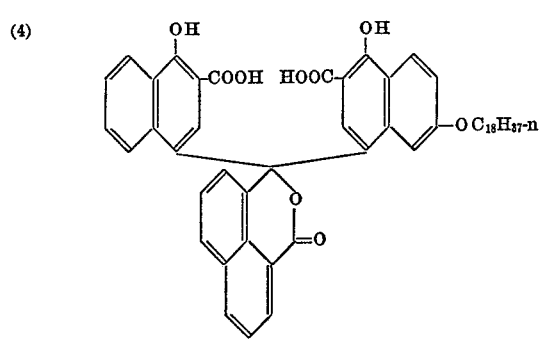
(5) 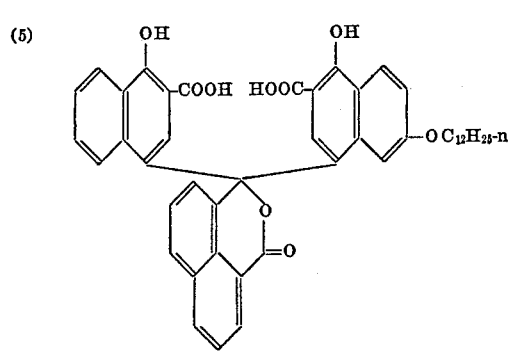
(6) 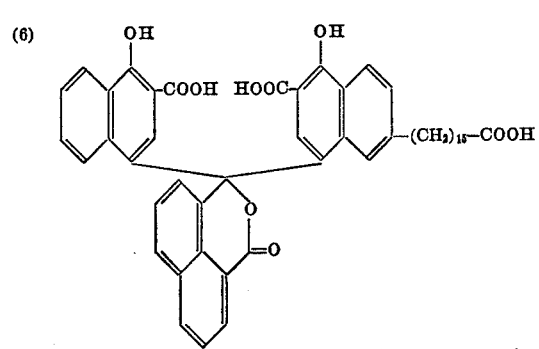
(7) 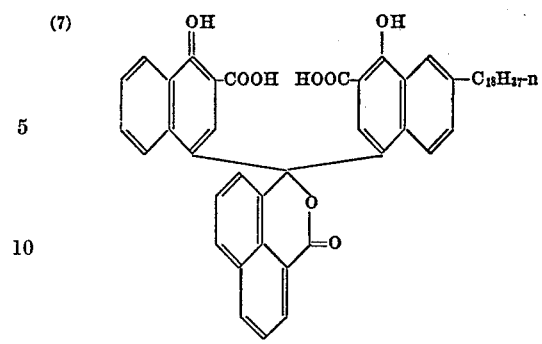
(8) 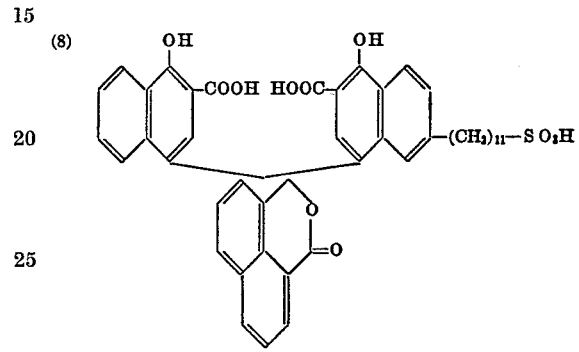
(9) 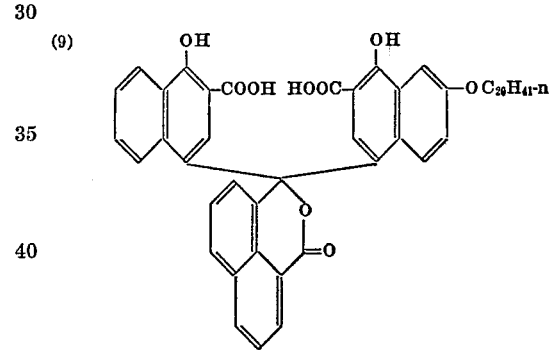
(10) 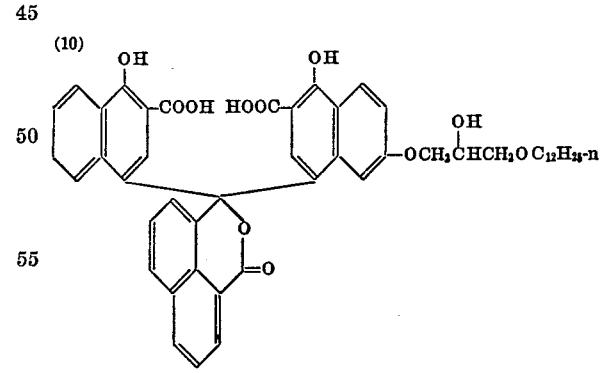
(11) 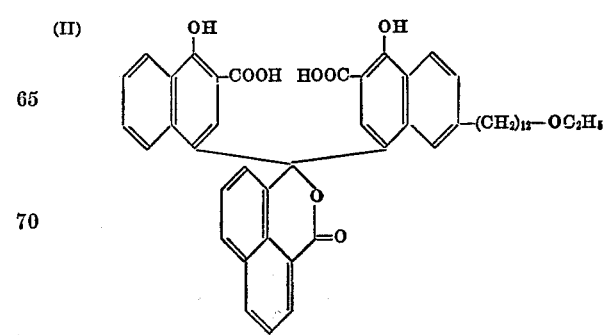

(12) 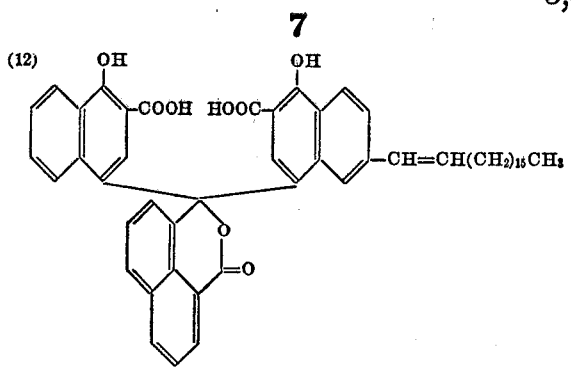

(13) 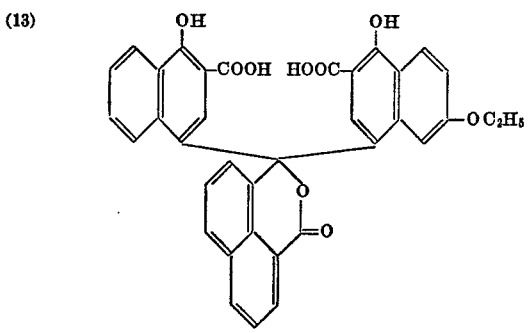

(14) 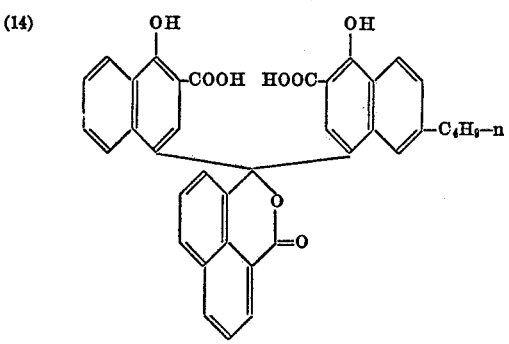

(15) 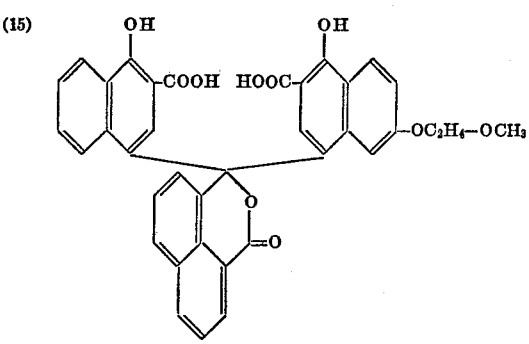

(16) 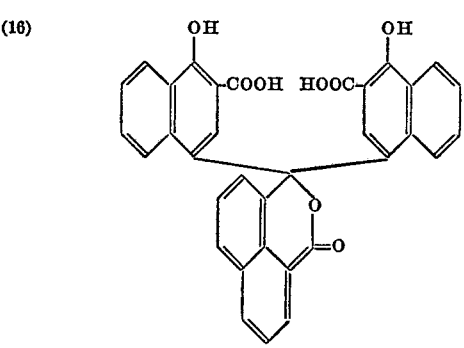

In preparing the 3-(3'-COOR'-4'-oxo-1-naphthylidene naphthalides of Formula I according to reaction A above, an acid acceptor is added to a solution of a 3-halo-3-(3'-COOR'-4'-hydroxy-1'-naphthyl)naphthalide in an inert organic solvent. Though the reaction may be conducted at elevated temperature, the removal of the proton from the naphtholic —OH and the removal of the 3-halo group proceeds readily at ambient temperature, i.e., about 20° to 40° C. to yield the corresponding dehydro compound. The 3-halo naphthalides employed, as represented in Formula IV above, may be a 3-bromo or preferably a 3-chloro-(3'-COOR'-4'-hydroxy - 1' - naphthyl)naphthalide wherein R' is lower alkyl having 1 to 4 carbon atoms, such as, ethyl, propyl, isopropyl, n-butyl, t-butyl and preferably methyl. Though the dehydro compound may be similarly prepared from naphthalides having a different leaving group, for example, from the sulfonates of a 3-hydroxy-3-(3'-COOR'-4'-hydroxy - 1' - naphthyl) naphthalide, such as, a 3-tosyloxy-3-(3'-COOR'-4'-hydroxy-1'-naphthyl)naphthalide, and 3-halo naphthalides are particularly convenient starting materials. The acid acceptor may be any of the reagents commonly employed for this purpose and preferably is pyridine or triethylamine. To facilitate recovery of the dehydro compound produced, the inert organic liquid employed as the solvent for the 3-halo naphthalide is preferably one in which the dehydro compound is insoluble. Particularly useful organic solvents of this type are aromatic hydrocarbons and chlorinated aliphatic and chlorinated aromatic hydrocarbons, for example, benzene, toluene, methylene chloride, and chlorobenzene.

To prepare the monoester intermediates of Formula II according to reaction B, a 3-(3'-COOR'-4'-oxo-1'-naphthylidene)naphthalide of Formula I and an organic carboxylic acid are heated together at elevated temperature, usually between about 50° and 150° C. Where the organic acid is a solid, the reaction may be conducted in an inert organic liquid solvent, for example, an aromatic hydrocarbon, such as, benzene, xylene or toluene. Otherwise, the reaction is conveniently carried out by heating a slurry of the dehydro intermediate in the liquid organic acid. The organic acid may be a mono- or dicarboxylic acid, aromatic or aliphatic including branched or straight chain saturated or unsaturated acids, for example, benzoic acid, phthalic acid, isophthalic acid, cinnamic acid, α-naphthoic acid, β-naphthoic acid, acetic acid, butyric acid, caproic acid, capric acid, malonic acid, glutaric acid, sebacic acid, acrylic acid, crotonic acid, vinylacetic acid, methacrylic acid, maleic acid, fumaric acid, muconic acid and so forth. The acid may be unsubstituted or substituted with, for example, amino, hydroxy, halo, mercapto, nitro, cyano, lower alkyl, lower alkoxy, acetyl, phenyl, phenyl substituted with methoxy, nitro, halo or cyano, phenoxy and phenoxy substituted with nitro, halo or cyano. While this method has broad application in preparing monoesters derived from a variety of unsubstituted and substituted organic acids, it is particularly useful in preparing $$3-O\overset{O}{\underset{\|}{C}}R-3-(3'-COOR'-4'-hydroxy-1'-naphthyl)naphthalides$$

wherein R is an alkyl group containing 1 to 10 carbon atoms, particularly unsubstituted or monosubstituted alkyl derived from a saturated aliphatic monocarboxylic acid, RCOOH.

In the production of carboxy-substituted 1-naphthol naphthalide indicator dye precursors according to reaction C, a 3-(3'-COOR'-4'-oxo-1'-naphthalidene)naphthalide of Formula I, an organic carboxylic acid and a 2-carboxy-1-naphthol are reacted at elevated temperature in an inert solvent in the presence of base. To prevent decarboxylation of the carboxy-naphthol reactant, the reaction temperature should not exceed about 85° C., and ordinarily, the reaction is conducted at a temperature between about 60° and 85° C. The solvent employed may be any inert organic liquid which is a solvent for the reactants but preferably, the solvent is an aromatic hydrocarbon, such as, benzene, toluene or xylene. The dehydro-intermediate, organic carboxylic acid and carboxy-substituted naphthol are generally reacted in substantially equimolar proportions. The base may be used in amounts ranging between about 0.001 and 2.0 moles and preferably between about 0.05 and 0.15 mole per mole of naphthol reactant.

The organic acid reactant may be a mono- or dicarboxylic acid, aromatic or aliphatic including branched or straight chain saturated or unsaturated acids, such as those mentioned for use in reaction B above. Preferably, it is a saturated aliphatic monocarboxylic acid, RCOOH, wherein R is an alkyl group containing 1 to 10 carbon atoms, particularly unsubstituted and monosubstituted alkyl. Illustrative acids which may be used in preparing the monoesters of Formula II and the indicator dyes and dye precursors of Formula III include the following:

| | |
|---|---|
| Acetic | Dihydroxybenzoic(3,5-) |
| Acetoacetic | Dimethylglycine |
| Acrylic | Diphenylacetic |
| α-Aminoacetic (glycine) | Ethylbenzoic |
| Angelic | Ethylphenylacetic |
| Adipic | Fluoroacetic |
| p-Aminobenzoic | Fluorobenzoic |
| Anisic | Fumaric |
| o-β-Anisylpropionic | Glutaric |
| m-β-Anisylpropionic | Heptanoic |
| p-β-Anisylpropionic | Hexanoic |
| n-Butyric | o-Hydroxybenzoic |
| iso-Butyric | m-Hydroxybenzoic |
| α-Aminobutyric | p-Hydroxybenzoic |
| n-Caproic | β-Hydroxybutyric |
| iso-Caproic | γ-Hydroxybutyric |
| Chloroacetic | β-Hydroxypropionic |
| o-Chlorobenzoic | Iodoacetic |
| m-Chlorobenzoic | o-Iodobenzoic |
| p-Chlorobenzoic | m-Iodobenzoic |
| α-Chlorobutyric | Lactic |
| β-Chlorobutyric | Lysine |
| Benzoic | Mercaptoacetic |
| Bromoacetic | β-Mercaptopropionic |
| o-Bromobenzoic | Methoxyacetic |
| m-Bromobenzoic | β-Methoxypropionic |
| α-Bromocaproic | Muconic |
| γ-Chlorobutyric | Maleic |
| o-Chlorophenoxyacetic | Methacrylic |
| m-Chlorophenoxyacetic | o-Nitrobenzoic |
| p-Chlorophenoxyacetic | m-Nitrobenzoic |
| o-Chlorophenylacetic | p-Nitrophenylacetic |
| m-Chlorophenylacetic | o-β-Nitrophenylpropionic |
| p-Chlorophenylacetic | p-β-Nitrophenylpropionic |
| β-(o-Chlorophenyl)propionic | Nonanoic |
| β-(m-Chlorophenyl)propionic | Octanoic |
| β-(p-Chlorophenyl)propionic | Phenylacetic |
| α-Chloropropionic | o-Phenylbenzoic |
| Crotonic | γ-Phenylbutyric |
| Cyanoacetic | α-Phenylpropionic |
| γ-Cyanobutyric | Pimelic |
| o-Cyanophenoxyacetic | Propionic |
| m-Cyanophenoxyacetic | iso-Propylbenzoic |
| p-Cyanophenoxyacetic | Sebacic |
| Cyanopropionic | Succinic |
| Dibromoacetic | Toluic (o-, m-, p-) |
| Dichloroacetic | Trihydroxybenzoic (2,4,6-) |
| Dihydroxybenzoic(2,2-) | Trimethylacetic |
| Dihydroxybenzoic(2,5-) | n-Valeric |
| Dihydroxybenzoic(3,4-) | iso-Valeric |

The 2-carboxy-1-naphthols employed in reaction C may be represented by the formula:

(V)

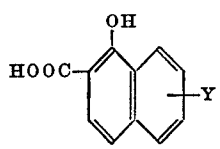

wherein Y has the same meaning given in Formula III above.

Among the naphthols which are particularly useful in the production of indicator dyes that are relatively or substantially immobile in a given solution are the alkoxy-substituted 2-carboxy-1-naphthols which form the subject matter of copending U.S. patent application Ser. No. 174,171 of Richard B. Greenwald filed Aug. 19, 1971. These naphthols may be synthesized by treating a 1,6- or 1,7-naphthalenediol with an acetylating agent in the presence of a Lewis acid catalyst to yield the corresponding 2-acetyl compound followed by oxidizing the 2-acetyl to a 2-carboxy group and reacting the 2-carboxy compound with an alkyl halide to yield the 2-carboxy-6 (or 7-) alkoxy-1-naphthol. These naphthols also may be prepared by treating a 1,6- or 1,7-naphthalenediol in solution in an aprotic solvent with carbon dioxide in the presence of a strong base to form the corresponding 2-carboxy compound which is then reacted with an alkyl halide to yield the alkoxy-substituted 2-carboxy-1-naphthol.

Useful as the catalyst are all bases strong enough to form salts with the naphtholcarboxyl acid (i.e., 2-carboxy-1-naphthol present in the reaction inluding weaker bases having a pKa down to but not less than about 2, all of which are capable of forming salts with the naphthol carboxylic acid to some extent. Also, because the intermediates tend to be sensitive to moisture, the base selected to catalyze the reaction should not produce or release water during the reaction. Other than inorganic oxides and hydroxides and other bases that would form water, any base having a pKa of not less than about 2, including both organic and inorganic materials may be employed. Illustrative bases that may be used as the catalyst include inorganic bases, such as, lithium, sodium and potassium hydrides or amides, and organic bases, for example, primary, secondary and tertiary aliphatic amines, such as, n-decylamine, di-n-butylamine, triethylamine, n-butylamine, diisopropylamine, piperazines, piperidines, morpholines and aromatic amines, such as, aniline 4-bromoaniline, N,N-diethylaniline, p-toluidine, N-methylaniline. Particularly useful catalysts are aromatic N-heterocyclic bases, such as, pyridines, picolines, lutidines, pyrimidines, pyridazines, pyrazines, imidazoles and quinolines. Preferred catalysts are the pyridines including pyridine and pyridine substituted with, for example, hydroxy, amino, halo, lower alkoxy and lower alkyl.

The dye precursor thus obtained may be hydrolyzed, for example, by treating with an alkaline hydroxide in aqueous or aqueous-organic solution to convert the 3'-carboalkoxy to a 3'-carboxy group to yield the desired indicator dye product. The alkaline hydroxide may be an alkaline earth hydroxide, such as calcium or barium hydroxide, or preferably, in alkali metal hydroxide, such as, sodium or potassium hydroxide. Any water-miscible organic liquid may be used to form the aqueous-organic solution, for example, alcohols, such as ethanol, methanol, isopropanol, or water miscible ethers, for example, 1,2-dimethoxyethane or tetrahydrofuran.

Though the dye precursor isolated from the reaction solution may be hydrolyzed directly to the corresponding indicator dye product, it may be purified, for example, by crystallization of the crude material in an appropriate solvent prior to the hydrolysis step. Suitable solvents include alcohols, such as, isopropanol; combinations of alcohols with chlorinated hydrocarbons, such as, isopropanol and methylene chloride mixture; or with ketones, such as, methanol and acetone mixture; and combinations of nitriles with ethers, esters, ketones or hydrocarbons, such as, mixtures of acetonitrile with dimethoxyethane, n-butyl formate, methyl ethyl ketone or benzene.

As noted above, in preparing the indicator dye precursors according to reaction C, the dehydro compound, organic carboxylic acid and carboxy-substituted naphthol preferably are reacted in substantially equimolar proportions. In synthesizing the dehydro compounds according to reaction A, the 3-halo naphthalide preferably is reacted with at least an equimolar amount of acid acceptor. Similarly, in the synthesis of the monoester compounds according to reaction B, the dehydro compound preferably is reacted with an equimolar quantity or an excess of organic carboxylic acid, i.e., with at least an equimolar amount of organic acid.

The following examples are given to further illustrate the present invention but are not intended to limit the scope thereof.

EXAMPLE 1

Preparation of 3-(3'-carbomethoxy-4'-oxo-1'-naphthyl) naphthalide 3-chloro-3-(3'-carbomethoxy-4'-hydroxy - 1'-naphthyl) naphthalide (16.7 g., 0.040 mole) was slurried in approximately 100 ml. of benzene at room temperature. Pyridine (3.2 g., 0.040 mole) was added to the slurry causing immediate formation of a red crystalline solid The red solid was filtered, washed with benzene and dried. After slurrying in water (in order to remove the pyridine hydrochloride by-product), the product was again filtered, washed with water and dried, yielding 14.5 g. (95% by weight theory) of red powder.

*Analysis.*—Calculated for $C_{24}H_{14}O_5$ (percent): C, 75.39; H, 3,69; O, 20.92. Found (percent): C, 74.96; H, 3.54; O, 20.91.

The material was instantly decolorized on dissolution in methanol, ethanol or acetic acid. The solution in methanol gave on thin layer chromatography, a single spot identical to that obtained with an authentic sample of the 3-methoxy derivative (as prepared from the chloride and methanol).

Example 1 was repeated using triethylamine instead of pyridine and using methylene chloride as the solvent to yield the title compound.

EXAMPLE 2

Preparation of 3-acetoxy-3-(3'-carbomethoxy-4'-hydroxy-1'-naphthyl)naphthalide 3-(3'-carbomethoxy - 4' - oxo-1'-naphthylidene)naphthalide (1.0 g.) was slurried in acetic acid (10.0 ml.) on a steam bath. The red color of the naphthalide was discharged, and an off-white solid was formed. The product was filtered, washed with benzene and oven dried in vacuo at 60° C. The IR spectrum of the product was found to be superimposable with the IR spectrum of a known sample of 3 - acetoxy-3-(3'-carbomethoxy-4'-hydroxy-1'-naphthyl)naphthalide.

EXAMPLE 3

Preparation of 3-(3' - carbomethoxy-4'-hydroxy-1'-naphthyl)-3-(3''-carboxy-4'''-hydroxy - 6'' - octadecyloxy-1'''-naphthyl)naphthalide 3-(3'-carbomethoxy - 4' - oxo-1'-naphthylidene)naphthalide (3.82 g.; 0.010 mole), 2-carboxy-6-octadecyloxy-1-naphthol (4.56 g.; 0.010 mole) and acetic acid (0.60 g.; 0.010 mole) were heated at reflux in 45 ml. of benzene for 2.5 hours in the presence of pyridine (approximately 0.0001 mole). The reaction solution was then evaporated to dryness in vacuo at 40° C. The solid was triturated with 200 ml. of methylene chloride with rapid stirring for 45 minutes and filtered giving 6.5 g. of crude product containing 71% by weight of the title compound, as shown by hydrolysis and measurement of the absorption at 648 nm. in 1:4 ethanol:6.4 N aqueous sodium hydroxide.

To obtain the indicator dye product, the dye precursor formed above may be isolated by complete removal of the benzene and hydrolyzed directly without purification, for example, by adding aqueous 50% sodium hydroxide to a solution of dye precursor in isopropanol and refluxing under nitrogen followed by cooling and neutralizing with a mixture of ice water, acetic acid and hydrochloric acid. To facilitate final purification of the dye product, however, the dye precursor usually is purified prior to the hydrolysis step by crystallization from an appropriate solvent, for example, methyl ethyl ketone or dimethoxyethane combined with acetonitrile. Alcohols such as isopropanol or 2-butanol may also be used. Particularly preferred as the crystallization solvent is 60:40 butyl formate: acetonitrile, since this system gives high recovery (80–82%) of highly pure precursor (96+ percent) in a single crystallization. Final purification of the dye product may be carried out by heating the crude dye in methanol at reflux, cooling, adding additional methanol and filtering the final dye from the methanol slurry.

The 3-halo naphthalides used in reaction A may be synthesized according to the method disclosed in copending U.S. patent application Ser. No. 192,638 of Richard B. Greenwald filed Oct. 26, 1971, by halogenation of a 3-hydroxy-3-(3'-lower carboalkoxy - 4' - hydroxy-1'-naphthyl) naphthalide to the corresponding 3-halo naphthalide, preferably, 3-chloro or 3-bromo. This may be accomplished by treating the 3-hydroxy naphthalide with phosphorus pentachloride, thionyl chloride, phosphorus pentachloride, N-chlorosuccinimide, phosphorus oxychloride, sulfuryl chloride, phosphorus tribromide, N-bromosuccinimide, aluminum bromide, aluminum chloride, bromotribromide, N-bromocaprolactam, cupric bromide or other conventional chlorination or bromination reagent.

The 3-hydroxy-3-(3'-lower carboalkoxy-4'-hydroxy-1'-naphthyl)naphthalides may be synthesized by forming a complex of a 1-hydroxy-2-alkyl naphthoate (2-carboalkoxy-1-naphthol) by reacting the naphthoate with anhydrous aluminum chloride followed by the addition of solvent, such as, nitrobenzene. Naphthalyl dichloride(3,3-dichloronaphthalide) is then added to the solution containing the naphthoate as an activated complex to form the 3-hydroxy-(3'-lower carboalkoxy - 4' - hydroxy-1'-naphthyl)naphthalide.

The 3 - chloro-3-(3'-carbomethoxy-4'-hydroxy-1'-naphthyl)naphthalide used in Example 1 was prepared as follows:

A suspension of 16.0 g. of 3-hydroxy-3-(3'-carbomethoxy-4'-hydroxy-1'-naphthyl)naphthalide-1,8 was heated under reflux with stirring with a solution of 9.5 g. of thionyl chloride in 100 ml. of methylene chloride, containing three drops of N,N-dimethylformamide, for 30 minutes, when a solution occurred. On cooling a solid crystallized from the purple solution. Hexane was added until no more solid precipitated. The solid was filtered and washed first with a small amount of methylene chloride and then with hexane, yielding 16.7 g. of the gray crystalline chloride. The conversion was quantitative as shown by thin layer chromatography.

The 1-hydroxy-6-octadecyloxy - 2 - naphthoic acid employed in Example 3 was prepared by adding sodium methoxide (67.4 gms., 1.35 mole) to a solution of 1,6-dihydroxy naphthalene (100 gms., 0.625 mole) in 900 ml. of dry carbon dioxide gas. A steady flow of carbon dioxide was maintained throughout the reaction. Approximately 125 ml. of dimethylformamide was distilled and the mixture was then refluxed for 15 minutes and an additional 125 ml. of solvent removed. The solution was cooled and the flow of carbon dioxide stopped. The reaction mixture was acidified with concentrated hydrochloric acid and then poured onto about 2000 gms. of ice. The precipitated dark solid was filtered and dried and then triturated with 1 liter of boiling benzene and filtered free of dark impurities. Recrystallization from water gave 1,6-dihydroxy-2-naphthoic acid as a white solid (melting range 220°–221° C.).

To a well-stirred slurry of 1,6-dihydroxy-2-naphthoic acid (5.1 gms., 0.025 mole) in 50 ml. of dry isopropyl alcohol under nitrogen was added potassium t-butoxide (5.65 gms., 0.050 mole). The mixture was heated to reflux and stirred 10–15 minutes and then octadecyl bromide (8.35 gms., 0.025 mole) was added. The reaction was refluxed for 5 hours, cooled and acidified with 20% hydrochloric acid. The solid which precipitated was filtered and dried and recrystallized from absolute ethanol to give 3.8 gms. of grey solid. Further recrystallization from chloroform gave 2.3 gms. of 1-hydroxy-6-octadecyloxy-2-naphthoic acid as a white solid (melting range 164°– 165° C.).

As noted above, the indicator dyes produced in accordance with the present invention are useful as optical filter agents in photographic processes, and because of their relatively high pKa, are particularly useful in diffusion transfer processes employing highly alkaline processing solutions. Their use as optical filter agents in photographic processes is disclosed and claimed in copending U.S. patent application Ser. No. 103,864 of Myron S. Simon and David P. Waller, filed Jan. 4, 1971. Certain 1-naphthol naphthalides including carboxy-substituted 1-naphthol naphthalides form the subject matter of copending U.S. patent application Ser. No. 103,865 of Myron S. Simon also filed Jan. 4, 1971.

The method comprising reaction C for preparing naphthalide indicator dyes and dye precursors and the method comprising reaction A for preparing dehydro naphthalides are claimed in my copending U.S. patent applications Ser. Nos. 314,094 and 313,963, respectively, both filed concurrently herewith.

Since certain changes may be made in the above process without departing from the scope of the invention herein involved, it is intended that all matter contained in the above description shall be interpreted as illustrative and not in a limiting sense.

What is claimed is:

1. A process which comprises reacting (a) a 3-(3'-lower carboalkoxy-4'-oxo-1'-naphthylidene)naphthalide with at least an equimolar amount of (b) an organic monocarboxylic acid at a temperature between about 50° and 150° C. to yield the corresponding 3-acyloxy-3-(3'-lower carboalkoxy-4'-hydroxy-1'-naphthyl)naphthalide.

2. A process as defined in claim 1 wherein said acid (b) is RCOOH wherein R is an alkyl group containing 1 to 10 carbon atoms.

3. A process as defined in claim 2 wherein said 3'-lower carboalkoxy of said naphthalide (a) is 3'-carbomethoxy.

4. A process as defined in claim 3 wherein said R of said acid RCOOH is methyl.

5. A process as defined in claim 1 wherein said (a) and (b) are reacted in substantially equimolar proportions.

6. A process a defined in claim 1 wherein said (a) and (b) are reacted in an inert organic solvent.

References Cited

Stille et al., J. Org. Chem., vol. 28 (1962), pp. 2703–2707.

HENRY R. JILES, Primary Examiner

M. A. M. CROWDER, Assistant Examiner